(12) United States Patent
Mancuso et al.

(10) Patent No.: US 7,338,379 B2
(45) Date of Patent: Mar. 4, 2008

(54) HIGH SPEED COUPLING SHEAR SPACER

(75) Inventors: Jon R. Mancuso, Catonsville, MD (US); Joseph P. Corcoran, Catonsville, MD (US); Tara H. Howland, Odenton, MD (US)

(73) Assignee: Emerson Power Transmission Manufacturing L.P., Maysville, KY (US)

( * ) Notice: Subject to any disclaimer, the term of this patent is extended or adjusted under 35 U.S.C. 154(b) by 225 days.

(21) Appl. No.: 11/172,407

(22) Filed: Jun. 30, 2005

(65) Prior Publication Data

US 2007/0004521 A1  Jan. 4, 2007

(51) Int. Cl.
*F16D 9/08* (2006.01)
(52) U.S. Cl. .......................................... 464/32; 384/126
(58) Field of Classification Search .................... 464/8, 464/9, 32, 33; 403/2, 11, 26; 384/126, 127; 310/75 R, 75 D
See application file for complete search history.

(56) References Cited

U.S. PATENT DOCUMENTS 5,800,137 A * 9/1998 Eitai et al. ................. 464/32 X 2003/0194263 A1* 10/2003 Ueda et al. .................... 403/2

* cited by examiner

*Primary Examiner*—Greg Binda
(74) *Attorney, Agent, or Firm*—Harness, Dickey & Pierce, P.L.C.

(57) ABSTRACT

An inner tubular wall is concentrically located inside an outer tubular wall to form an annular space therebetween. A bearing is retained within the annular space. The bearing can include a pair of precision angular contact bearings, the bearing may also include an axial sleeve bearing. A frangible element such as an annular shear groove is associated with one of the outer tubular wall and the inner tubular wall. Separation occurs at the frangible element and the bearing supports the inner tubular wall member and the outer tubular wall member for rotation relative to each other upon the coupling assembly experiencing a shear event. In addition, the angular contact bearings may reduce any bending moments that might otherwise impact upon the frangible element during normal operation. The frangible element may be treated, for example, by shot-peening or coating to reduce deterioration of the frangible element during normal operation.

29 Claims, 4 Drawing Sheets

HIGH SPEED COUPLING SHEAR SPACER

FIELD OF THE INVENTION

The present invention relates to rotating coupling components that connect a drive unit to a driven unit; and more particularly, to such components that are designed to manage a shear event.

BACKGROUND OF THE INVENTION

Rotating couplings that connect a drive unit to a driven unit are known in the art. These rotating couplings provide the connection that enables the drive unit to drive the driven unit. On occasion, these rotating couplings will be subjected to a dramatic shear event. For example, a generator may experience a short circuit causing a sudden stop in its rotation. The drive unit connected to the generator, however, is still rotating the coupling which subjects the coupling, and the connected equipment, to a sudden, high torsional shear event.

Historically, there have been two ways of designing rotating couplings to handle such shear events at typical motor speeds (e.g., up to about 3,600 rpm). First, the couplings, and the connected equipment, have been sized so that they are sufficiently strong that they can withstand the torsional shear encountered in a shear event. Of course, this can mean dramatically increasing the size and weight of the coupling components and equipment components.

Another way of designing the coupling components to handle a shear event, and help protect connected equipment, has been to include a frangible element in association with one of the existing coupling components. For example, flanges of two of the rotating coupling components can be connected using frangible bolts which shear upon encountering a shear event. As another example, a shear groove can be located in one of the existing components along which the component will separate during a shear event.

Neither of these solutions have resulted in a coupling capable of operating at high speeds to handle a shear event. As indicated above, the previous couplings have typically operated at normal motor speed of less than about 3,600 rpm. Couplings operating at high speed, e.g., above about 4,000 rpm or above about 5,000 rpm, have been unable to successfully use the methods described above to handle a shear event.

For example, couplings having a size sufficient to handle a high-speed shear event are typically too massive to spin at high speeds. In addition, including frangible bolts or a frangible groove on existing coupling components can have a high tendency to send dangerous metal parts flying, particularly at high speeds. Further, the use of a frangible groove in an existing coupling component can require replacement of an unnecessarily large component and/or significant down time depending upon, for example, where it is located in the coupling assembly. Accordingly, it is desirable to provide a coupling design that is capable of handling a shear event, even at high speeds, without one or more of the problems associated with previous designs, including, for example, one or more of the problems specifically identified above.

SUMMARY OF THE INVENTION

In accordance with one aspect of the present invention a rotating coupling assembly for connecting a driving unit to a driven unit is provided. The rotating coupling assembly includes an outer tubular wall and an inner tubular wall concentrically located inside the outer tubular wall to form an annular space between the inner tubular wall and the outer tubular wall. A bearing assembly comprising a rotary bearing and an axial bearing is retained within the annular space. A frangible element is associated with the annular space. Separation occurs at the frangible element and the rotary bearing supports the inner tubular wall member and the outer tubular wall member for rotation relative to each other and the axial bearing permits axial movement of the inner tubular wall relative to the outer tubular wall, upon the coupling assembly experiencing a shear event.

In accordance with another aspect of the invention a coupling unit is provided. The rotating coupling assembly for connecting a driving unit to a substantially axially aligned driven unit includes a generally tubular member that further includes a driving end, a driven end, an outer tubular wall, an inner tubular wall and a connecting wall between the outer tubular wall and the inner tubular wall. The driving end has a driving connecting portion coupled to a first hub of one of the driving unit or the substantially aligned driven unit; the driven end has a driven connection portion coupled to a second hub of the other of the driving unit or the substantially aligned driven unit. An annular bearing cavity is provided between the outer tubular wall and the inner tubular wall. A frangible feature is associated with the generally tubular member. In addition to the generally tubular member, the coupling unit includes a bearing retained in the bearing cavity wherein the bearing provides support of and permits rotation of the inner tubular wall relative to the outer tubular wall upon separation at the frangible feature in response to a shear event.

In accordance with another aspect of the present invention a high-speed rotating coupling unit including a generally tubular one-piece member is provided. The generally tubular one-piece member further includes a driving end having a driving connecting portion and a driven end having a driven connecting portion, the driving connecting portion being axially spaced from the driven connecting portion. An outer tubular wall is associated with one of the driving connecting portion and the driven connecting portion. An inner tubular wall is associated with the other of the driving connecting portion and the driven connecting portion. The inner tubular wall has an inner step associated with an inner surface thereof. A connecting wall is provided between the outer tubular wall and the inner tubular wall, thereby forming an annular bearing cavity between the outer tubular wall and the inner tubular wall. A frangible groove is associated with the bearing cavity. In addition to the generally tubular one-piece member, the high-speed coupling unit includes a pair of angular contact bearings located in the annular bearing cavity. An inner annular retainer is attached to the inner tubular wall to press the pair of angular contact bearings against the inner step of the inner tubular wall at an inner periphery of the angular contact bearings. A bearing holder has a bearing holder inner step associated with an outer bearing surface thereof. An outer annular retainer is attached to the bearing holder to press the pair of angular contact bearings against the bearing holder inner step at an outer periphery of the angular contact bearings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
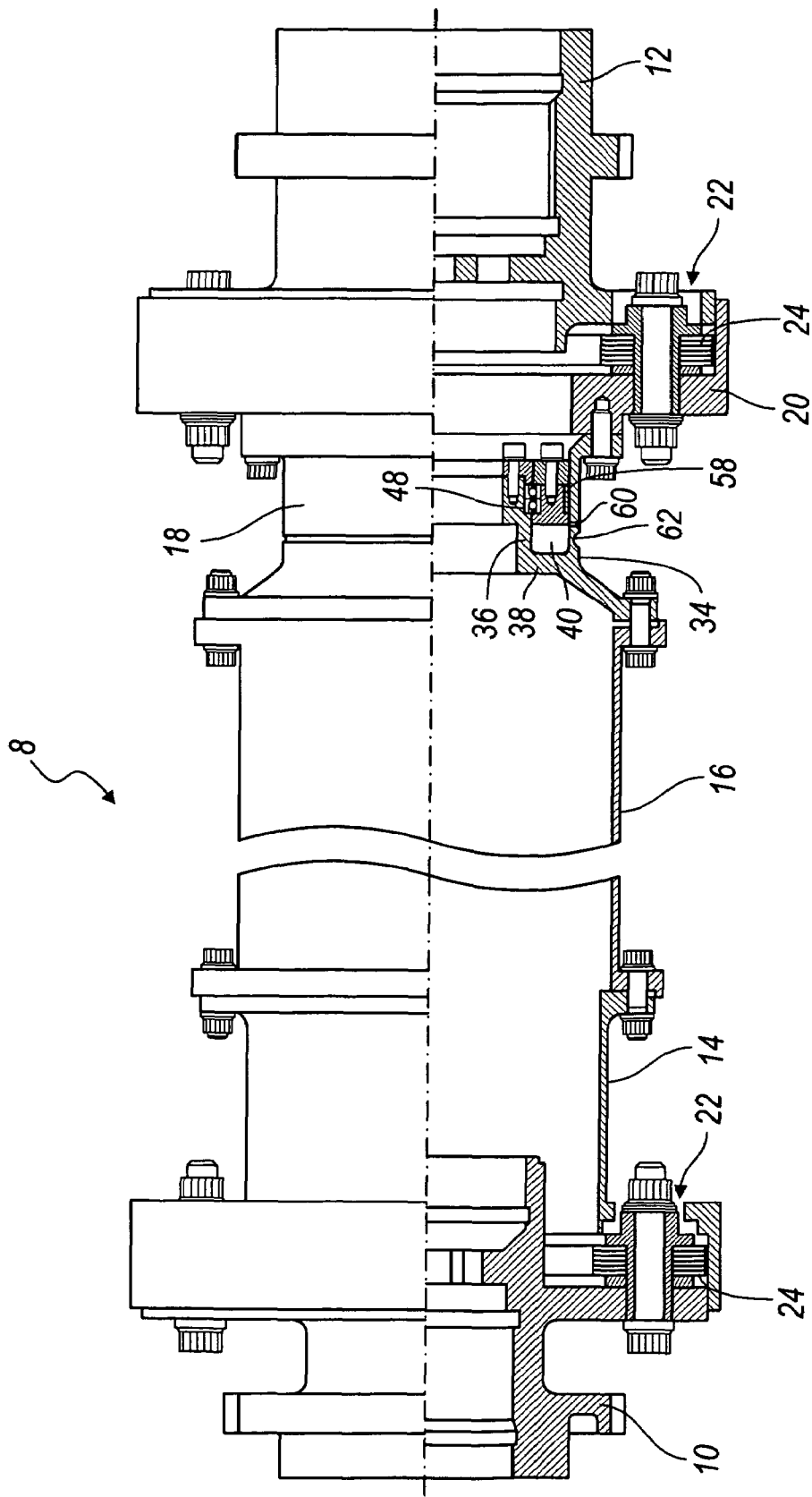
FIG. 1 is a partial cross sectional view of a coupling assembly.

Referring to FIG. 1, a coupling assembly 8 is provided to connect a driving unit to a driven unit. Specifically, a driving hub 10 is connected to a driven hub 12, with various connecting components; including a tubular sleeve 14, a tubular spacer 16, a shear coupling unit 18 and an adapter 20. The coupling assembly 8 is adapted to transfer the rotary driving force from a driving unit, e.g., a turbine or other motor, to a driven unit, e.g., a gearbox, through their respective hubs, 10 and 12, respectively.

The coupling assembly 8 additionally includes a disc pack assembly 22 associated with each of the driving hub 10 and the driven hub 12. Each disc pack assembly 22 includes a plurality of thin, flexible discs 24 that provide a flexing coupling for connecting adjacent components, thereby enabling compensation for the typical misalignment between the drive unit and the driven unit. For example, the flexible discs 24 of the disc pack assembly 22 on the driven side of the coupling assembly 8 are alternately connected to the adapter 20 and the hub 12 around the peripheries thereof. The coupling assembly could alternatively or additionally include diaphragms, gear teeth, elastomeric material, or other elements to compensate for misalignment.

Figure 2:
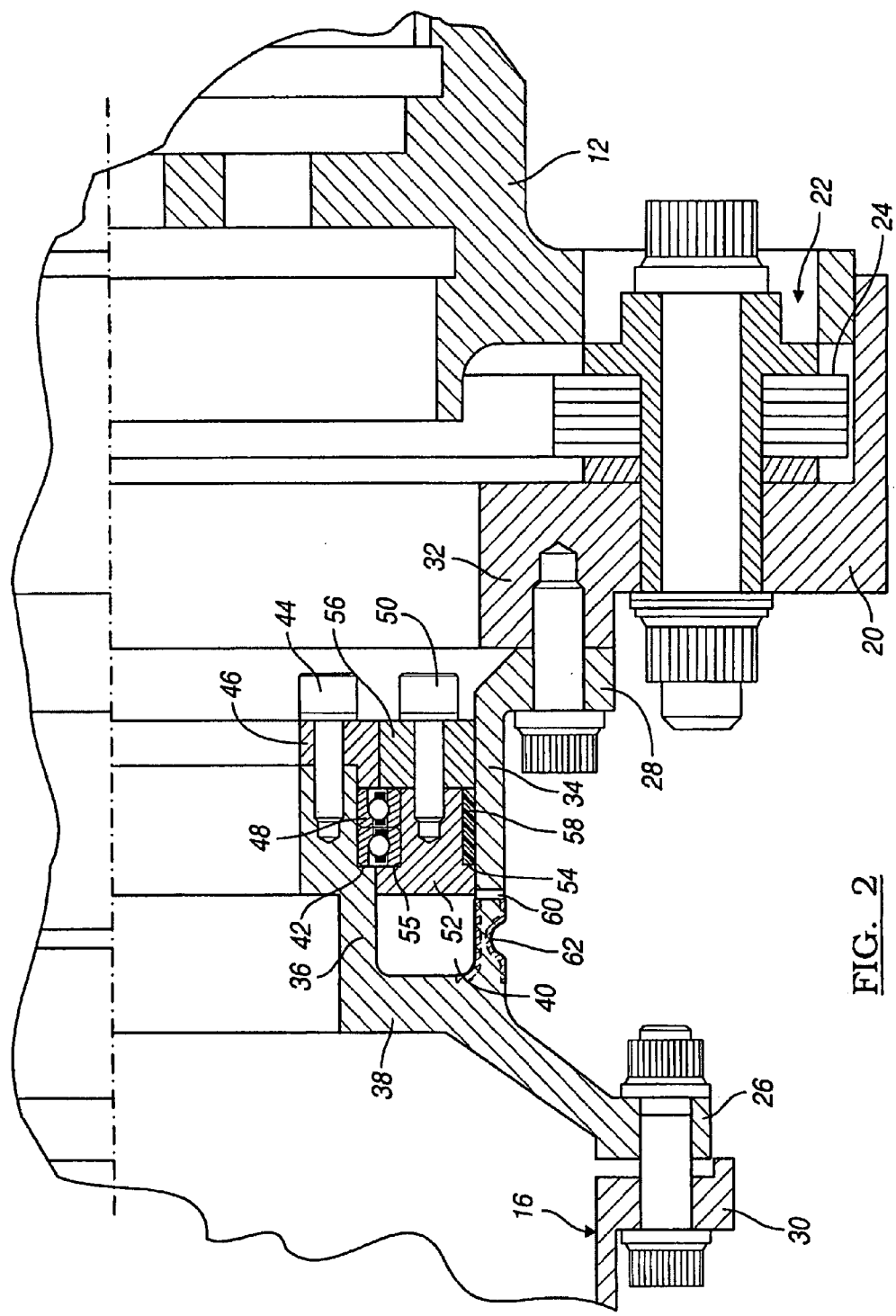
FIG. 2 is an enlarged fragmentary cross sectional view of a portion of the coupling assembly embodiment of FIG. 1.

Referring to FIG. 2, the shear coupling unit 18 of this embodiment includes a generally tubular member 9 (indicated at FIG. 3) that is one-piece component. The shear coupling unit 18 includes an annular driving flange 26 for attachment to the coupling components on the driving side of the shear coupling unit 18 and an annular driven flange 28 for attachment to the coupling components on the driven side of the shear coupling unit 18. The annular driving flange 26 is bolted to a corresponding annular flange 30 of the tubular spacer 16. Similarly, the annular driven flange 28 is bolted to a corresponding connecting part 32 of the adapter 20.

Between the annular flanges of the shear coupling unit 18 is an outer tubular wall 34 and an inner tubular wall 36, which both extend in an axial direction. An annular connecting wall 38 extends radially between and connects the outer tubular wall 34 to the inner tubular wall 36. Thus, a bearing cavity 40 is provided between the inner tubular wall 36 and the outer tubular wall 34 of the generally tubular member 9 of the shear coupling unit 18. The axial inner tubular wall 36 includes a step 42 associated with an inner surface thereof that provides part of a bearing seat.

Bolts 44 attach an inner annular bearing retainer 46 to the distal end of the inner tubular wall 36 to hold a pair of precision, high-speed angular contact bearings 48 against the step 42 of the inner annular wall 36 at the inner peripheral portion of the angular contact bearings 48. Thus, the inner annular retainer 46 forms part of an bearing assembly that is associated with the inner tubular wall 36 to hold the opposing ends of the pair of angular contact bearings 48 at an inner peripheral portion thereof.

A bearing holder 52 has an outer step 54 associated with an outer bearing surface thereof, and an inner step 55 associated with an inner bearing surface thereof. Bolts 50 attach the bearing holder 52 and an outer annular bearing retainer 56 together to hold the opposing ends of the pair of angular contact bearings 48 at an outer peripheral portion thereof. Thus, the angular contact bearings 48 are associated with the inner tubular wall 36 through the step 42 and the inner annular retainer 46. Similarly, the angular contact bearings 48 are associated with the outer tubular wall 34 through the bearing holder 52 and the outer annular retainer 56.

The outer step 54 of bearing holder 52 and the outer annular bearing retainer 56 also forms a recess for retaining an axial bearing 58 between the outer bearing holder 56 and the outer tubular wall 34. The axial bearing 58 is a split ring sleeve bearing and can be made of a Teflon impregnated bronze. The axial bearing 58 can permit axial movement of coupling components relative to each other and can also permit rotation of the coupling components relative to each other as discussed hereinafter.

The precision, high-speed angular contact bearings 48 are arranged in back-to-back relationship as seen in the drawings. In addition, the bearings 48 are preloaded against each other. For example, a subassembly may be created by locating the pair of angular contact bearings 48 inside the bearing holder 52 against the outer bearing surface thereof. The axial bearing 58 can be located outside the bearing holder 52 against the outer bearing surface thereof. Then, the bearing holder 52 is connected to the outer annular retainer 56 using the threaded bolts 50. This entire subassembly is inserted into the bearing cavity 40 and the inner annular retainer 46 is attached to the inner tubular wall 36 using the bolts 44. Each of the bolts 44, 50 can be torqued to a specified amount in order to provide a desired preloading on the angular contact bearings 48.

The outer tubular wall 34 of the shear coupling unit 18 can include one or more weep holes 60. The weep holes 60 are throughholes that extend into the cavity 40 defined by the inner tubular wall 36, the outer tubular wall 34, the connecting wall 38 and the bearing holder 52. As a result, any oil, condensation or other potentially corrosive material tends to exit the cavity 40 through the weep holes 60 under centrifugal force during normal rotation of the coupling 8. It is worth noting that in this embodiment this cavity 40 is defined by a portion of the outer tubular wall 34 that includes a frangible feature in the outer surface thereof.

The frangible feature of this embodiment is a shear groove 62 located in the outer tubular wall 34, axially between the connecting wall 38 and the bearings 48, 58. The generally tubular member 9 of the shear coupling unit 18 is made of steel or other material. In addition, the steel or other material can be heat treated. Further, it can be desirable that the yield strength of the material be within about 20% of the ultimate strength, thereby helping to ensure a clean shear surface.

After subjecting the generally tubular member 9 of the shear coupling unit 18 to the heat treatment or other process, a test specimen of the same material that was simultaneously subjected to the same process is tested to determine the shear strength of the material. Based upon this determination, the annular shear groove 62 is precision machined into the outer surface of the outer tubular wall 34. In this way, the annular groove 62 can be precision machined so that the torsional shear stress at which this frangible feature will separate can be predicted within close tolerances. For example, it can be possible to machine the shear groove 62 so that the outer tubular wall 34 separates along the shear groove 62 at a torsional shear stress that is within about 10 percent of a calculated amount; and can even be within about 5 percent of a calculated amount.

Figure 3:
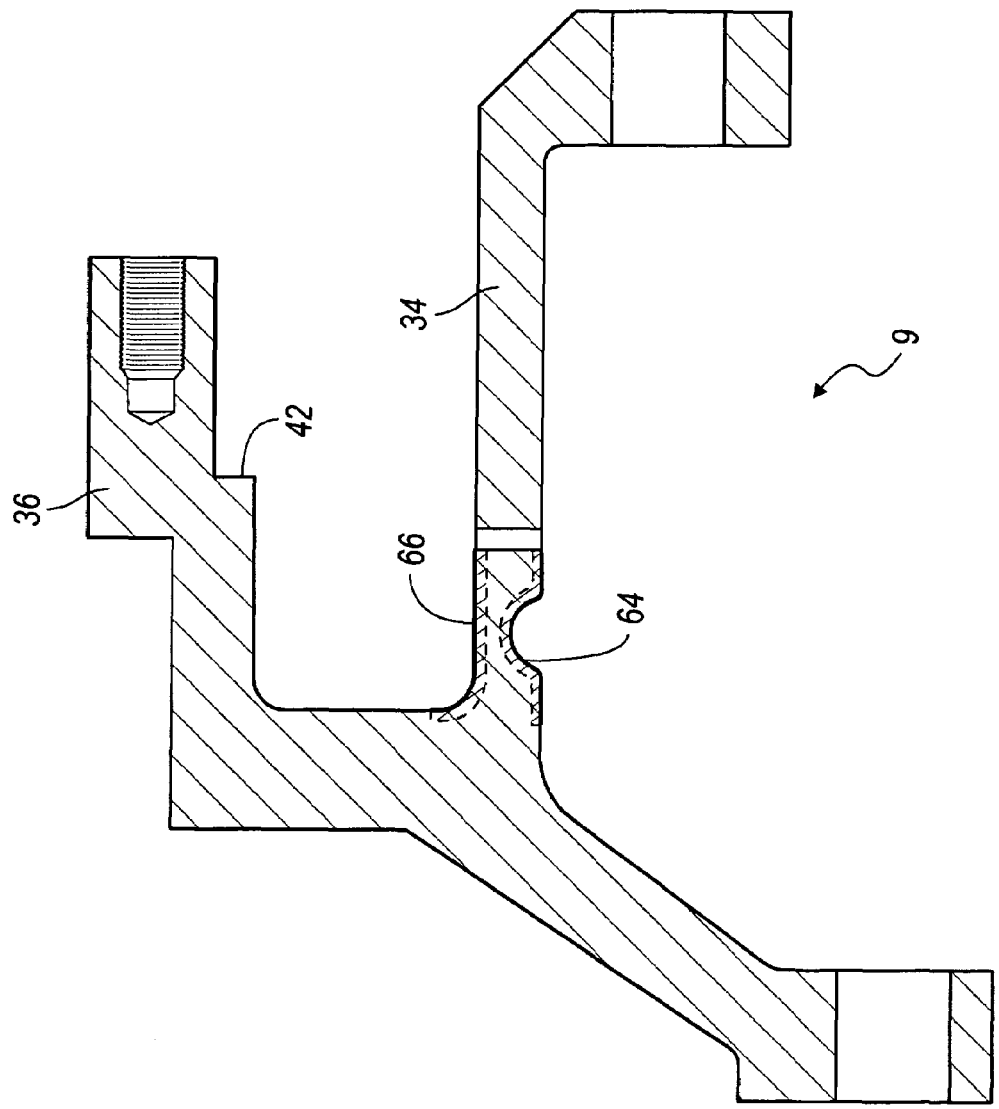
FIG. 3 is an enlarged fragmentary cross sectional view of a portion of the generally tubular member of the embodiment of FIG. 1.

Referring to FIG. 3, a portion of the shear coupling unit 18 that includes the annular groove 62 can be treated to reduce changes over time in the shear stress at which separation at the shear groove 62 will occur. For example, an outer annular band portion (indicated by the dotted lines) 64 of the outer surface of the outer tubular wall 34 including the shear groove 62 and also including some adjacent outer surface area of the outer tubular wall 34 can be subjected to a shot-peening operation. Similarly, an opposing inner annular band portion (also indicated by the dotted lines) 66 on an area of the inner surface corresponding substantially to the outer annular band portion 64 on the outer surface can alternatively or additionally be subjected to a shot-peening operation. During the shot-peening process, the shear groove surface and inner diameter are bombarded with small round hard material which produces a compressive stress at the surface, which reduces the possibility of fatigue cracks developing.

Similarly, the inner annular band portion 66 and the outer annular band portion 64 of the generally tubular member 9 can be treated by applying a corrosion preventative thereto to reduce changes over time in the shear stress at which separation at the shear groove 62 will occur. Alternatively, some larger portion of the surfaces of the generally tubular member 9, up to and including all of the surfaces thereof, can be coated with a corrosion preventative. One example of such a corrosion preventative coating is an epoxy coating. For example, Scotchkote 134 Fusion Bonded Epoxy Coating is resistant to wastewater, hydrocarbons, harsh chemicals and seawater, and can be purchased from 3M, Corrosion Protection department, 6801 River Place Blvd., Austin, Tex., 78726-9000. Other suitable coatings can be used.

Returning to FIGS. 1 and 2, in operation, the coupling assembly 8 is capable of rotating at high speeds. As a result of typical misalignment between the driving unit and the driven unit, the discs 24 of the disc pack assemblies 22 can flex, thereby transferring bending moments to the coupling assembly 8. During normal operation of the shear coupling unit 18, the angular contact bearings 48 operate to counteract the bending moments acting on the shear groove 62 as a result of flexing at the adjacent disc pack assembly 22, or other flexing elements. Thus, the potential deteriorating effect of metal fatigue caused by these bending moments on the adjacent shear groove 62 over time is reduced.

When a shear event occurs, the outer tubular wall 34 of the shear coupling unit 18 separates at the frangible shear groove 62. For example, a shear event can involve any torsional stress that is some amount greater (for example, 1.5 times greater) than the normal torsional stress acting on the shear groove 62 and less than the shear torsional stress that would cause damage to the driving unit or the driven unit. Upon separation at the frangible shear groove 62, the angular contact bearings 48 permit the components 10, 14, 16, 38, 36 of the coupling assembly 8 associated with the driving unit side of the shear groove 62 to rotate relative to the components 12, 20, 28 of the coupling assembly 8 associated with the driven side of the shear groove 62. Thus, any of the components of the coupling assembly 8 that are still spinning following the shear event are permitted to coast down from high speed.

When the outer wall 34 of the shear coupling unit 18 separates at the shear groove 62, it is possible that the edges created may have an irregular shape. As a result, the edges may include portions that can interfere with each other. If such interference occurs and the newly created opposing edges contact each other, the axial bearing 58 permits axial movement of the components associated with the driving unit relative to components associated with the driven unit. This axial movement permits an increased gap between the edges, which can reduce the possibility that such edge interference will cause parts to fly off during coast-down. In addition, the axial bearing 58 can enable rotation between the inner tubular wall 36 and the outer tubular wall 34 of the shear coupling unit 18. Thus, the axial bearings 58 can operate as a back-up to the angular contact bearings 48 during coast-down.

In addition, the bearings 48, 58 in association with the bearing holder 52 also support the components 10, 14, 16, 36, 38 of the coupling assembly 8 associated with the driving unit relative to the components 12, 20, 28 of the coupling assembly 8 associated with the driven unit during coast-down. As a result, any wobbling of the coupling assembly 8 components is reduced, thereby reducing the possibility of damage to the other coupling assembly components 10, 12, 14, 16, 20 and/or the possibility of dangerous flying debris. This can be particularly important at high speeds.

As discussed above, the coupling assembly 8 includes a flexing element 24 associated with each of the driving hub 10 and the driven hub 12. This flexing element 24 helps accommodate for any misalignment between the driving unit and the driven unit. The flexing elements 24 can be disc pack assemblies 22 as illustrated herein. It can be desirable to locate the shear coupling unit 18 (and in particular the shear groove 60 and the angular contact bearings 48) in close proximity to the disc pack assembly 22 in order to reduce bending moments acting upon the shear coupling unit during normal operation. For example, the shear groove 62 and/or the angular contact bearings 48 are preferably, within about one radius of one of the flexing elements 24; and more preferably, within about ½ radius from one of the flexing elements 24.

In order to facilitate simple replacement of the shear coupling unit 18, it can be desirable to include an adapter 20 between the disc pack assembly 22 and the shear coupling unit 18. Thus, the shear coupling unit 18 can be replaced without impacting the coupling of the disc pack assembly 22. The adapter 20 provides a driven coupling for direct attachment to the disc pack assembly 22 and a driving coupling 32 for direct attachment to the coupling flange 28 of the shear coupling unit 18. The overall axial length of the adapter 20 is relatively small in order to minimize any bending moments acting on the shear groove 62 as discussed above.

Also in order to reduce the costs associated with providing a replaceable shear coupling unit 18, it can be desirable to shorten the overall axial length of the shear coupling unit 18. As a result, the amount of material required to make the shear coupling unit 18 can be reduced, thereby reducing replacement costs. For example, the overall axial dimension of the shear coupling unit 18 is less than about one diameter of the coupling unit 18; more preferably, less than about ½ diameter of the coupling unit 18.

Figure 4:
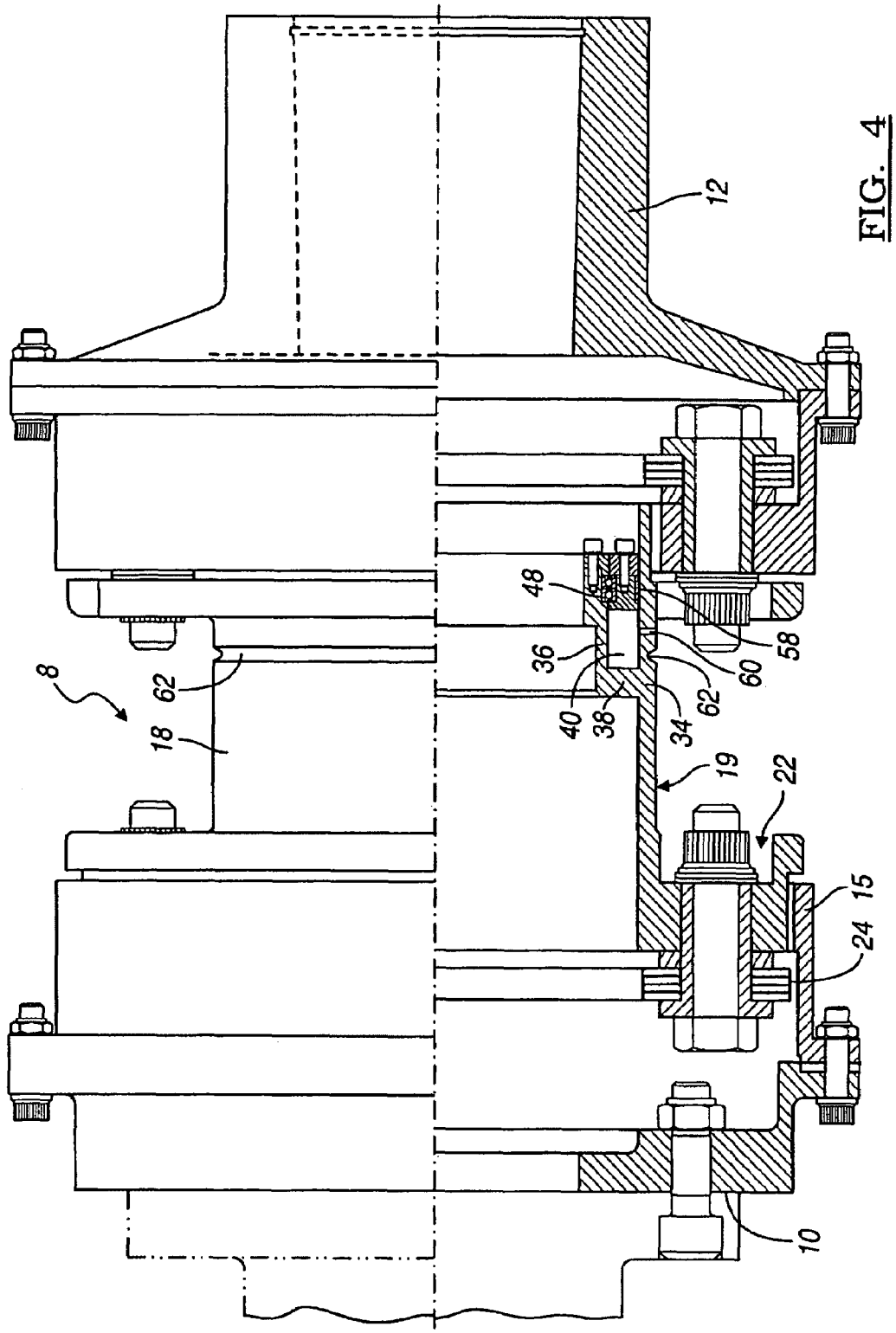
FIG. 4 is a partial cross sectional view of another coupling assembly embodiment.

Referring to FIG. 4, another embodiment of a coupling assembly 8 wherein similar elements are identified by the same reference numerals used with respect to FIGS. 1 to 3. This coupling assembly includes a driving hub 10, a driven hub 12, an adapter 15 and an adapter 19. This embodiment can be understood from the description provided above, and therefore, the description will not be repeated herein.

The description of the invention is merely exemplary in nature and, thus, variations that do not depart from the gist of the invention are intended to be within the scope of the invention. For example, the generally tubular member 9 is illustrated herein as a one-piece member, although it may also be possible to provide the features of the generally tubular member 9 as multiple parts. Of course, there are many other modifications that may be made to the specific embodiments described herein. Such variations are not to be regarded as a departure from the spirit and scope of the invention.

What is claimed is:

1. A rotating coupling assembly for connecting a driving unit to a driven unit comprising:
   an outer tubular wall;
   an inner tubular wall concentrically located inside the outer tubular wall to form an annular space between the inner tubular wall and the outer tubular wall;
   a bearing assembly comprising a rotary bearing and an axial bearing retained within the annular space;
   a frangible element associated with the annular space;
   wherein separation occurs at the frangible element and the rotary bearing supports the inner tubular wall member and the outer tubular wall member for rotation relative to each other and the axial bearing permits axial movement of the inner tubular wall relative to the outer tubular wall, upon experiencing a shear event.

2. A rotating coupling assembly according to claim 1, wherein the bearing assembly reduces bending moments that would otherwise be transferred to the frangible element, during normal operation of the coupling.

3. A rotating coupling assembly according to claim 2, wherein the rotary bearing is a pair of precision angular contact bearings.

4. A rotating coupling assembly according to claim 1, wherein the outer tubular wall and the inner tubular wall are portions of a one-piece component connected by a connecting wall.

5. A rotating coupling assembly according to claim 1, wherein the frangible element is an annular groove in one of the outer tubular wall and the inner tubular wall.

6. A rotating coupling assembly according to claim 1, wherein the frangible element has been treated to reduce deterioration thereof.

7. A rotating coupling assembly according to claim 1, further comprising a weep hole in the outer tubular wall to provide a flow path from the annular space to the exterior of the rotating coupling assembly.

8. A rotating coupling assembly for connecting a driving unit to a substantially axially aligned driven unit comprising:
   a generally tubular member further comprising:
      a driving end with a driving connecting portion coupled to a first hub of one of the driving unit or the substantially aligned driven unit;
      a driven end with a driven connection portion coupled to a second hub of the other of the driving unit or the substantially aligned driven unit;
      an outer tubular wall, an inner tubular wall and a connecting wall between the outer tubular wall and the inner tubular wall;
      an annular bearing cavity provided between the outer tubular wall and the inner tubular wall; and
      a frangible feature associated with the generally tubular member; and
   a bearing retained in the bearing cavity;
   wherein the bearing provides support of and permits rotation of the inner tubular wall relative to the outer tubular wall upon separation at the frangible feature in response to a shear event.

9. A rotating coupling assembly according to claim 8, wherein the bearing comprises a pair of angular contact bearings.

10. A rotating coupling assembly according to claim 8, wherein the bearing comprises an axial bearing that permits axial movement of the inner tubular wall and the outer tubular wall upon separation at the frangible feature in response to a shear event.

11. A rotating coupling assembly according to claim 8, wherein the bearing comprises a bearing assembly further comprising:
   a bearing holder having an inner surface and an outer surface;
   a pair of angular contact bearings supported on one of the outer surface or the inner surface of the bearing holder; and
   wherein the axial bearing comprises an axial sleeve bearing supported on the other of the outer surface or the inner surface of the bearing holder.

12. A rotating coupling assembly according to claim 11, wherein the inner tubular wall includes an inner step, the bearing holder includes a bearing holder inner step, and the bearing assembly further comprises;
   an inner annular retainer attached to the inner tubular wall to press the pair of angular contact bearings against the inner step at an inner periphery of the angular contact bearings; and
   an outer annular retainer attached to the bearing holder to press the pair of angular contact bearings against the bearing holder inner step at an outer periphery of the angular contact bearings.

13. A rotating coupling assembly according to claim 12, wherein the outer annular retainer extends radially past the outer surface of the bearing holder to retain the axial bearing on the outer surface of the bearing holder.

14. A rotating coupling assembly according to claim 8, wherein the frangible element is an annular groove in one of the outer tubular wall member and the inner tubular wall member.

15. A rotating coupling assembly according to claim 8, wherein the frangible element has been subjected to a shot-peening process; thereby reducing the potential of fatigue cracks.

16. A rotating coupling assembly according to claim 8, further comprising a corrosion resistant coating over the frangible element.

17. A rotating coupling assembly according to claim 8, further comprising a weep hole in the outer tubular member to provide a flow path from the annular bearing cavity to the exterior of the rotating coupling assembly.

18. A rotating coupling assembly according to claim 8, wherein the generally tubular member is a one-piece component.

19. A rotating coupling assembly according to claim 8, wherein at least one of the driving connecting portion is indirectly coupled to the first hub, or the driven connection portion is indirectly coupled to the second hub.

20. A high-speed rotating coupling unit comprising:
a generally tubular one-piece member further comprising:
- a driving end with a driving connecting portion and a driven end with a driven connecting portion, the driving connecting portion being axially spaced from the driven connecting portion;
- an outer tubular wall associated with one of the driving connecting portion and the driven connecting portion,
- an inner tubular wall associated with the other of the driving connecting portion and the driven connecting portion, and the inner tubular wall having an inner step associated with an inner surface thereof;
- a connecting wall between the outer tubular wall and the inner tubular wall, thereby forming an annular bearing cavity between the outer tubular wall and the inner tubular wall; and
- a frangible groove associated with the bearing cavity;
a pair of angular contact bearings located in the annular bearing cavity;
an inner annular retainer attached to the inner tubular wall to press the pair of angular contact bearings against the inner step of the inner tubular wall at an inner periphery of the angular contact bearings; and
a bearing holder having a bearing holder inner step associated with an inner bearing surface thereof; and
an outer annular retainer attached to the bearing holder to press the pair of angular contact bearings against the bearing holder inner step at an outer periphery of the angular contact bearings.

21. A high-speed rotating coupling unit according to claim 20, further comprising an axial sleeve bearing, wherein the bearing holder includes an outer bearing surface and step associated therewith, and wherein the outer annular retainer extends radially past the outer surface of the bearing holder to retain the axial bearing between the outer step of the outer bearing surface and the outer annular retainer.

22. A high-speed rotating coupling unit according to claim 20, wherein an outer surface area of the outer tubular wall that includes the frangible groove and an generally corresponding opposing inner surface area of the outer tubular wall has been subjected to a shot-peening process, thereby reducing the possibility of fatigue cracks.

23. A high-speed rotating coupling unit according to claim 20, further comprising a corrosion resistant coating located on an outer surface area of the outer tubular wall that includes the frangible groove and a generally corresponding opposing inner surface area of the outer tubular wall.

24. A high-speed rotating coupling unit according to claim 20, further comprising a weep hole in the outer tubular member to provide a flow path from the annular bearing cavity to the exterior of the rotating coupling unit.

25. A high-speed rotating coupling unit according to claim 20, wherein an overall axial dimension of the coupling unit is less than about one diameter of the coupling unit.

26. A high-speed rotating coupling assembly comprising the high speed rotating coupling unit of claim 20, and further comprising a flexing coupling associated with one of a driving unit and a driven unit on a first side thereof, and the flexing coupling associated with the coupling unit on a second side thereof;
wherein the high-speed rotating coupling unit is located so that a distance between the flexing coupling and the frangible groove of the rotating coupling unit is less than about one radius of the flexing coupling.

27. A high-speed rotating coupling assembly according to claim 26, further comprising an adapter located between and connecting the flexible coupling with the rotating coupling unit.

28. A rotating coupling assembly for connecting a driving unit to a driven unit comprising:
an outer tubular wall;
an inner tubular wall concentrically located inside the outer tubular wall to form an annular space between the inner tubular wall and the outer tubular wall;
an axial bearing retained within the annular space;
a frangible element associated with the annular space;
wherein separation occurs at the frangible element and the axial bearing permits axial movement of the inner tubular wall relative to the outer tubular wall, upon experiencing a shear event.

29. A rotating coupling assembly for connecting a driving unit to a driven unit comprising:
an outer tubular wall;
an inner tubular wall concentrically located inside the outer tubular wall to form an annular space between the inner tubular wall and the outer tubular wall;
a bearing retained within the annular space;
a frangible element associated with one of the outer tubular wall and the inner tubular wall; and
a weep hole in the outer tubular wall to provide a flow path from the annular space to the exterior of the rotating coupling assembly;
wherein separation occurs at the frangible element and the bearing supports the inner tubular wall member and the outer tubular wall member for rotation relative to each other, upon experiencing a shear event.

* * * * *